US005761262A

United States Patent [19]
No et al.

[11] Patent Number: 5,761,262
[45] Date of Patent: Jun. 2, 1998

[54] PASSIVE CONTAINMENT COOLING SYSTEM OF NUCLEAR REACTOR

[75] Inventors: Hee-Cheon No; Soon-Heung Chang; Hyun-Sik Park, all of Taejon, Rep. of Korea

[73] Assignee: Korea Advanced Institute of Science and Technology, Taejon, Rep. of Korea

[21] Appl. No.: 759,019

[22] Filed: Dec. 2, 1996

[30] Foreign Application Priority Data

Jan. 12, 1995 [KR] Rep. of Korea ............... 95-46068

[51] Int. Cl.$^6$ ............... G21C 15/00; G21C 9/00
[52] U.S. Cl. ............... 376/298; 376/299; 376/283
[58] Field of Search ............... 376/282, 283, 376/293, 298, 299, 305, 309

[56] References Cited

U.S. PATENT DOCUMENTS

| | | | |
|---|---|---|---|
| 4,473,528 | 9/1984 | Kleimola | 376/282 |
| 5,049,353 | 9/1991 | Conway et al. | 376/293 |
| 5,091,144 | 2/1992 | Dillmann et al. | 376/283 |
| 5,106,571 | 4/1992 | Wade et al. | 376/283 |
| 5,158,742 | 10/1992 | Dillmann | 376/299 |
| 5,169,595 | 12/1992 | Cooke | 376/282 |
| 5,353,318 | 10/1994 | Gluntz | 376/283 |
| 5,398,267 | 3/1995 | Reinsch | 376/298 |
| 5,428,652 | 6/1995 | Conrads et al. | 376/299 |
| 5,596,613 | 1/1997 | Gluntz et al. | 376/283 |

FOREIGN PATENT DOCUMENTS

| | | | |
|---|---|---|---|
| 0578392 | 1/1994 | European Pat. Off. | 376/283 |
| 93-04481 | 3/1993 | WIPO | 376/298 |

OTHER PUBLICATIONS

"Applications of Passive Safety to Large PWRs", T. van de Venne, Intl. Conf. on Design and Safety of Adv. NPPs, pp. 10.1-1 to 10.1.7, ANP '92.

Thermal Hydraulic Aspects of the SBWR Design, Shiralkar et al., Intl. Conf. on Design and Safety of Adv. NPPs, ANP' 92, pp. 31.1-1 to 31.1-7.

"Anal. of SBWR Passive Containment Cooling Following a LOCA", Vierow et al., Intl. Conf. on Design and Safety of ADV NPPs, ANP'92, pp. 31.2-1 to 31.2-7.

"Heat Removal Tests of Isol. Cond. Applied as a PCCS", Nagasaka et al., JSME-ASME, Intl. Conf. on Nuc. Eng., pp. 257-263, Nov. 1991.

Primary Examiner—Michael J. Carone
Assistant Examiner—Matthew J. Lattig
Attorney, Agent, or Firm—Darby & Darby

[57] ABSTRACT

A passive containment cooling system for a nuclear reactor and a method of cooling a pressurized water reactor thereby has an isolation condensing means for cooling and condensing steam and accumulating and cooling noncondensable gas released from within a containment of a nuclear reactor. A steam-driven air ejector which is driven by steam of high temperature and pressure generated from a steam generator is used to exhaust the noncondensable gas from the isolation condensing means, to flow the noncondensable gas into the containment. A steam generator makeup water storage tank makes up the water inventory of the steam generator and provides security for steam generator water inventory lost by operation of the steam-driven air ejector. This leads to the removal of early decay heat by dumping steam from the steam generator into the tank and injection of makeup water into the steam generator during the early stage of an accident.

8 Claims, 1 Drawing Sheet

PASSIVE CONTAINMENT COOLING SYSTEM OF NUCLEAR REACTOR

FIELD OF THE INVENTION

The present invention relates to a passive containment cooling system for a nuclear reactor, more specifically, to a passive containment cooling system for a nuclear reactor which comprises an air ejector and a steam generator makeup water storage tank, and also relates to a method of cooling a pressurized water reactor by employing a passive containment cooling system.

BACKGROUND OF THE INVENTION

A nuclear power plant ("NPP") has played an important part in the generation of electricity since the 1950's, and it is distinguished from a thermoelectric or hydroelectric power plant in view of efficiency, safety and environmental preservation. The generation of electricity by nuclear power is accomplished by the nuclear fission of radioactive materials. However, a problem would occur in the operation of a nuclear reactor if the radioactive material abnormally leaked out. Therefore, the concern for safety has been raised as one of the most important issues in the operation of a NPP. In this connection, efforts have been concentrated on the development of a highly efficient reactor whose safety problem is fairly resolved.

In general, a pressurized water reactor ("PWR") for the newer types of NPP's are classified into an evolutionary type and a passive type. In the case of the evolutionary type, some parts of the design relating to human operation were remodeled, focusing on the improvement of reliability of the system, while maintaining the format of a conventional reactor. On the other hand, a reactor of the passive type was realized by employing proven technologies of conventional reactors. Safety of the NPP using a passive type reactor depends on passive means, e.g., gravity, natural circulation and pressure, and not on active means, e.g., an external power supply.

New passive type reactors such as SPWR (simplified pressurized water reactor) of the AP600 type (a 600 MWe advanced passive plant) and SBWR (simplified boiling water reactor), have been developed by United States companies which can be employed in power plants having a capacity as low as 600 MWe. However, power plants of high capacity of 1000 MWe or more have been given much attention relative to the total of NPP's throughout the world owing to the difficulty in securing building sites.

For example, since the AP600 developed by Westinghouse Electric Corporation employs a passive containment cooling system ("PCCS") and uses a large steel shell, it requires a large containment and water storage tank for upgrade to higher capacity output. This gives rise to difficult problems to solve in the manufacture of the steel shell and to provide earthquake resistant construction. In this connection, passive safety systems used in the AP600 have been applied in a PWR for high capacity electricity generation (see T. VandeVenne, ANP'92 Int'l. Conf. on Design and Safety of Advanced Nuclear Power Plants, 10.1). These systems are different from the present invention described below, which can be used in a PCCS having a concrete containment structure.

On the other hand, it has been well known that a PCCS using an isolation condenser with an SBWR, developed by General Electric, causes no problem in upgrade to high capacity in a PWR. In this connection, the PCCS using the isolation condenser with an SBWR ha been also developed in Korea. However, it is distinguished from the present invention in that the invention has the following characteristics: an isolation condenser is combined to a PCCS to condense a mixture of noncondensable gas and steam, and a steam-driven air ejector and a steam generator makeup water storage tank are also combined with the PCCS; a steam-driven air ejector is employed to remove noncondensable gas accumulated within the isolation condenser; the isolation condenser is employed in order to prevent release of contaminated steam and noncondensable gas mixture from the concrete passive containment. That is, the PCCS of the invention employs closed circulation of steam-noncondensable gas mixtures and employs an isolation condenser with an SBWR; and, a steam generator makeup water system is employed, that is, the PCCS employs a steam generator makeup water storage tank to make up water loss in a steam generator caused by the supply of steam into a steam-driven air ejector.

On the other hand, B. S. Shiralker et al. identified important phenomena in the SBWR, and showed simple qualification results for the TRACG code (Transient Reactor Analysis code) (see B. S. Shiralker et al., ANP'92 Int'l Conf. on Design and Safety of Advanced Nuclear Power Plants. 31.1).

Karen M. Vierow et al. analyzed cooling efficiency of SBWR containment using ICS (Isolation Condenser condensation heat exchange system) and PCCS by the aid of TRACG code in order to evaluate the system behavior for long-term decay heat removal following a LOCA (loss of coolant accident) (see Karen M. Vierow et al., ANP'92 Int'l Conf. on Design and Safety of Advanced Nuclear Power Plants. 31.2).

Also, H. Nagasaka et al reported experimental results about the potential heat removal degradation due to accumulation of noncondensable gas inside an isolation condenser considered as PCCS of SBWR (see H. Nagasaka et al., ICONE-1 Proceedings of 1st JSME-ASME Int'l Conf. on Nuclear Engineering B-1).

However, all of the prior art are distinguished from the present invention, in the sense that the invention can be applied to a PWR, and a steam-driven air ejector and a steam generator makeup water storage tank are equipped therein.

On the other hand, the boiling water reactor ("BWR") has a suppression tank, by which noncondensable gas detrimental to cooling efficiency of a PCCS can be properly removed therefrom. However, since a PWR does not have a suppression tank, efforts to remove noncondensable gas have been made, described as follows:

In one way of removing noncondensable gas, an air ejector has been employed in a condenser of a nuclear power plant, based on the principle that primary flow of high pressure results in induced flow of the fluid (the noncondensable gas) to be removed. If the concept of an isolation condenser of an SBWR is applied in a PWR, the difficulty in upgrade to high capacity can be properly resolved, which is a serious problem in a PCCS of the AP600 type using a large steel shell. However, if the isolation condenser is applied to a PCCS, an air ejector is essentially required, since noncondensable gas is accumulated within the isolation condenser. In addition, since the air ejector works with the aid of steam from a steam generator, a water supply is necessary to make up steam loss in the steam generator. Also, a PWR of large capacity can be fabricated by employing the present concrete containment of the PWR.

Accordingly, there are strong reasons for exploring and developing a novel PCCS which can be applied to a concrete containment of a PWR to cool the containment passively.

SUMMARY OF THE INVENTION

In accordance with the present invention, the present inventors employed the concept of an isolation condenser, which is used as a passive containment cooling system (PCCS) of a simplified boiling water reactor (SBWR), to provide a cooling system in which noncondensable gas is removed by an air ejector, and water in a steam generator is made up by the aid of a steam generator makeup water storage tank which can be successfully applied to a pressurized water reactor (PWR) of large capacity.

A primary object of the present invention is, therefore, to provide a passive containment cooling system (PCCS) which comprises an air ejector and a steam generator makeup water storage tank.

The other object of the invention is to provide a method of cooling a nuclear reactor.

BRIEF DESCRIPTION OF THE DRAWINGS

The above and the other objects and features of the present invention will become apparent from the following description taken in conjunction with the accompanying drawing, in which.

DETAILED DESCRIPTION OF THE INVENTION

Figure 1:
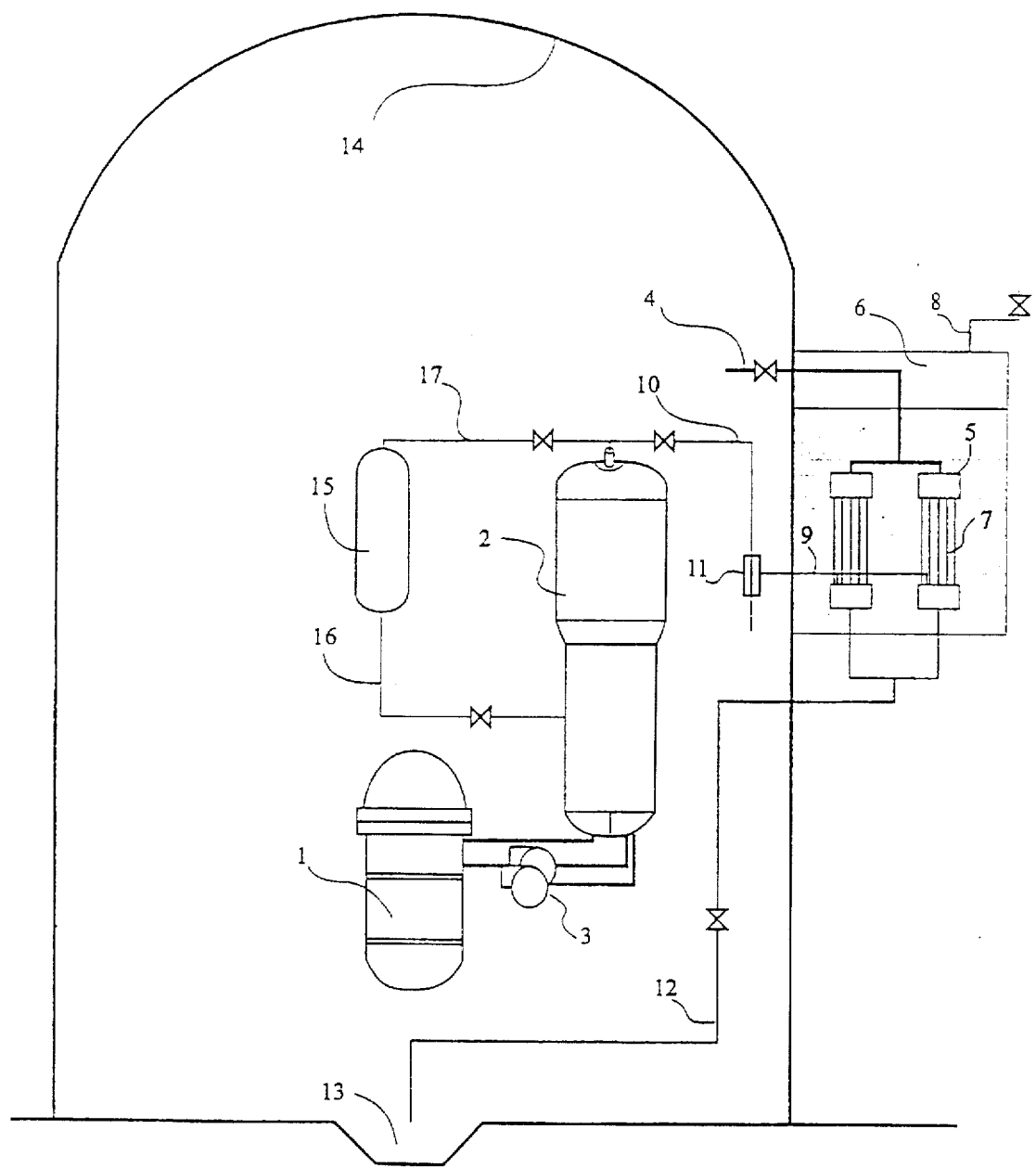
FIG. 1 is a schematic diagram showing a passive containment cooling system of the present invention.

A passive containment cooling system (PCCS) of the present invention comprises:

an isolation condensing means for cooling and condensing steam and for accumulating noncondensable gas from within a containment structure of a nuclear reactor;

a steam-driven air ejector which is driven by steam of high temperature and by which pressure generated from a steam generator exhausts noncondensable gas from the isolation condensing means and flows the noncondensable gas into the containment structure; and a steam generator makeup water storage tank to make up the water supply of the steam generator.

The isolation condensing means comprises an isolation condenser pool, an isolation condenser and an isolation condenser tube. Steam and noncondensable gas mixtures within the containment of the nuclear reactor flows into the isolation condenser. The steam is condensed and the noncondensable gas is accumulated in the isolation condenser tube by the aid of water of low temperature in an isolation condenser pool.

Steam of high temperature and pressure generated from the steam generator flows into the steam-driven air ejector through a steam exhaust line and drives the steam-driven air ejector to exhaust the noncondensable gas accumulated in the isolation condenser to the containment. Flow of the steam of high temperature and pressure into the steam-driven air ejector results in reduction of water inventory in the steam generator. Thus, a steam generator makeup water storage tank is used to make up the water inventory.

Steam of high temperature and pressure, to remove early decay heat transmitted to the steam generator, is dumped into the steam generator makeup water storage tank through a steam generator dumping pipe, and water in the tank is injected into the steam generator through a steam generator makeup water injection pipe to make up water loss caused by work of the steam-driven air ejector.

A preferred embodiment of the present invention is explained in more detail with references of the accompanying drawing, which should not be taken to limit the scope of the invention.

FIG. 1 is a schematic diagram showing a PCCS according to the preferred embodiment of the invention. When a loss of coolant accident (LOCA) occurs in a nuclear reactor, steam is accumulated within a containment (14) and is mixed with existing air, which, in turn, results in increase of pressure and temperature within the containment. Then, a signal for isolation of the containment is produced and valves in a condensate exhaust line (12) and a steam exhaust line (10) open so that condensate accumulated within an isolation condenser tube (7) is released into a sump (13) through the condensate exhaust line (12). Also, steam within the containment (14) flows into the isolation condenser tube (7) through isolation condenser inlet connection line (4) together with noncondensable gas. The flowing gas mixture of high temperature and pressure is condensed within the isolation condenser tube (7) by the aid of water of low temperature in an isolation condenser pool (6), and the condensate water is drained into the sump (13) through the condensate exhaust line (12) by gravity.

On the other hand, noncondensable gas flowing into the isolation condenser tube (7) reflows into the containment (14) through noncondensable gas exhaust line (9) and a steam-driven air ejector (11). Steam of high temperature and pressure generated from a steam generator (2) flows into the steam-driven air ejector (11) through steam exhaust line (10), and drives the steam-driven air ejector (11) to exhaust the noncondensable gas accumulated in an isolation condenser (5). Flow of the steam of high temperature and pressure into the steam-driven air ejector (11) results in the reduction of water inventory in the steam generator (2). Thus, a steam generator makeup water storage tank (15) is provided to make up the water inventory. Also, the steam of high temperature from a nuclear reactor (1) to the steam generator (2), is dumped into the steam generator makeup water storage tank (15) through a steam generator dumping pipe (17. Water in the tank (15) is injected into the steam generator (2) through a steam generator makeup water injection pipe (16) to make up water loss caused by operation of the steam-driven air ejector (11).

In accordance with the present invention, the passive containment cooling system (PCCS) and method of cooling a pressurized water reactor thereby have the following advantages. Installation of a steam generator makeup water storage tank provides security for the steam generator water inventory lost by operation of a steam-driven air ejector, and leads to the removal of early decay heat by dumping steam from the steam generator into the tank and injection of makeup water into the steam generator during the early stage of an accident. Also, stable operation of the reactor using the steam of a steam generator operating a steam-driven air ejector can be guaranteed, and heat removal efficiency of a PCCS can be increased owing to the exhaust of noncondensable gas by the steam-driven air ejector.

Although the preferred embodiments of the present invention have been disclosed for illustrative purposes, those who are skilled in the art will appreciate that various modifications, additions and substitutions are possible, without departing from the scope and spirit of the invention as disclosed in the accompanying claims.

We claim:

1. A passive containment cooling system for a pressurized water reactor having a containment which comprises:

isolation condensing means located outside of the containment for cooling and condensing steam and cooling and accumulating noncondensable gas released from within the reactor containment;

a steam-driven air ejector driven by steam generated from a steam generator to exhaust the accumulated noncondensable gas from said isolation condensing means to flow the noncondensable gas back into the containment; and a steam generator makeup water storage tank communicating with said steam generator to make up the water inventory of said steam generator.

2. The passive containment cooling system of claim 1, wherein said isolation condensing means comprises an isolation condenser pool, an isolation condenser and an isolation condenser tube.

3. The passive containment cooling system of claim 2, wherein said isolation condenser pool cools and condenses steam and cools noncondensable gas within the containment of the pressurized water reactor by the use of water.

4. The passive containment cooling system of claim 2, wherein said isolation condenser accumulates the noncondensable gas.

5. The passive containment cooling system of claim 2, wherein said isolation condenser tube condenses steam and accumulates noncondensable gas from within the containment of the pressurized water reactor.

6. A passive containment cooling system as in claim 1, further comprising a steam generator dumping pipe by which the steam from the steam generator is dumped into the steam generator makeup water storage tank to balance the pressure between said steam generator and said steam generator makeup water storage tank.

7. A method of cooling a pressurized water reactor by employing the passive containment cooling system of claim 1.

8. A passive containment cooling system for a pressurized water reactor having a containment which comprises:

isolation condensing means located outside of the containment for cooling and condensing steam and cooling and accumulating noncondensable gas released from within the reactor containment;

a water pool for cooling the noncondensable gas accumulated in said isolation condensing means; and a steam-driven air ejector driven by steam generated from a steam generator to exhaust the accumulated noncondensable gas from said isolation condensing means to flow the noncondensable gas back into the containment.

* * * * *